Patented July 29, 1930

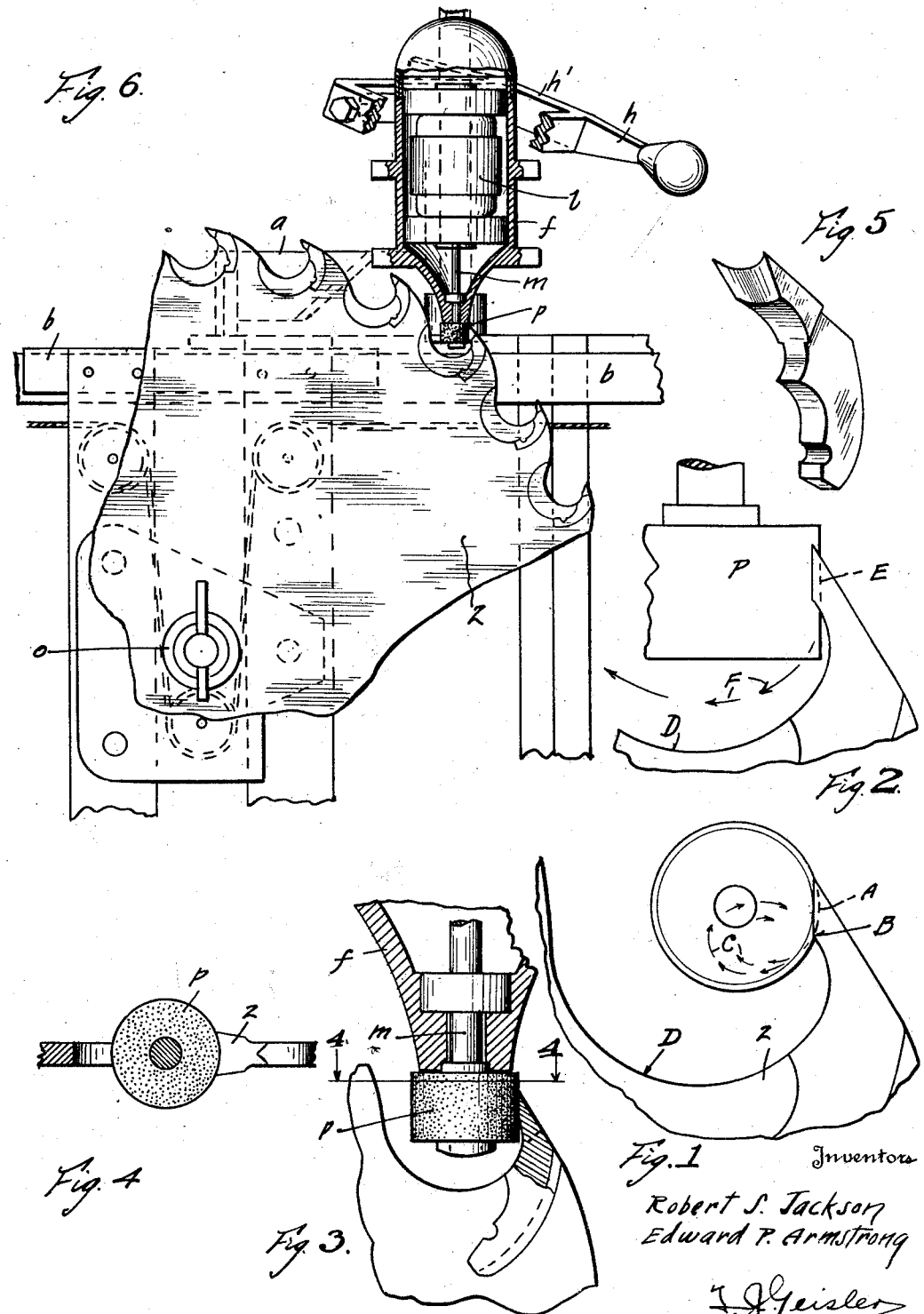

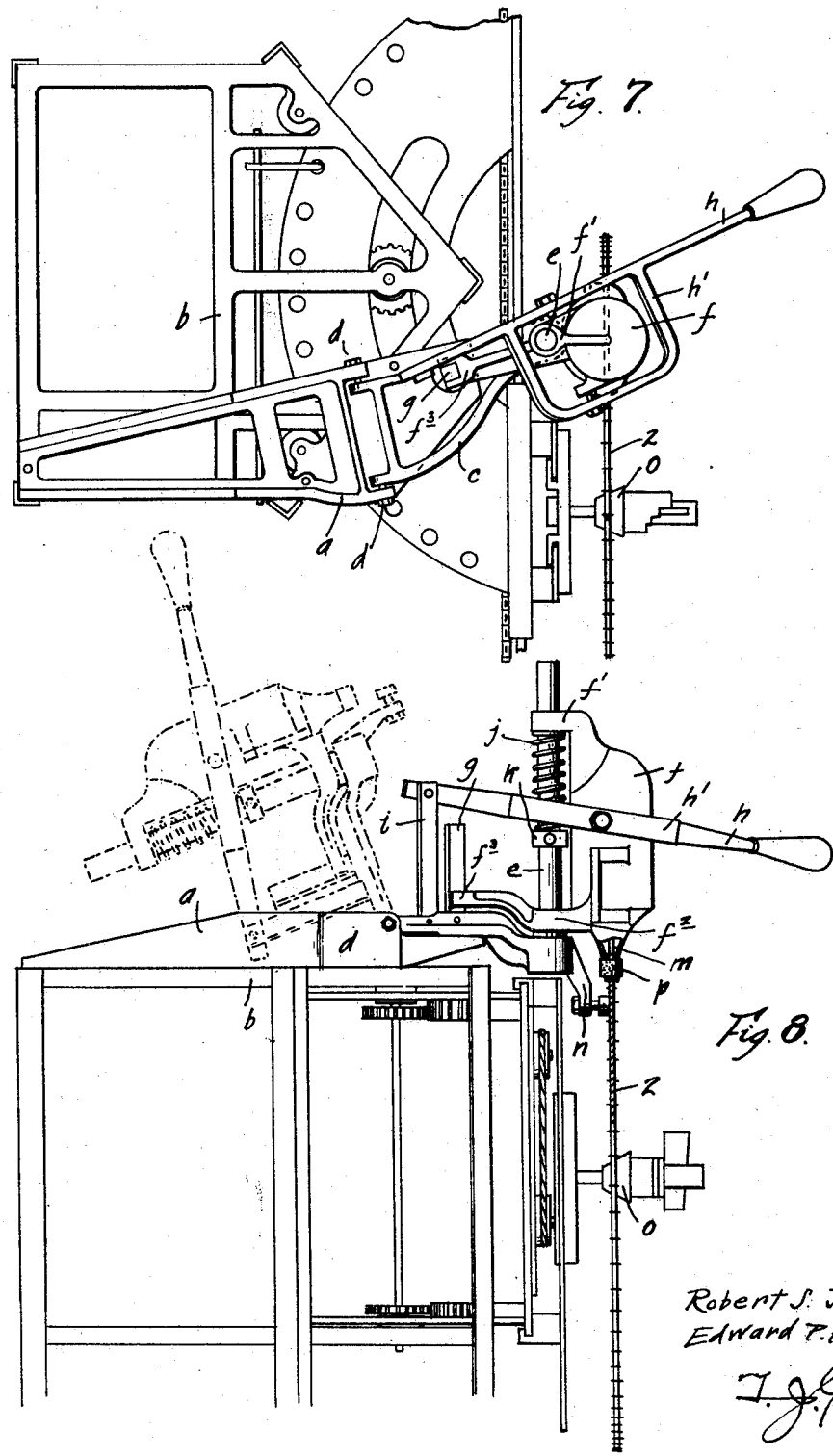

1,771,602

UNITED STATES PATENT OFFICE

EDWARD P. ARMSTRONG, OF PORTLAND, AND ROBERT S. JACKSON, OF EUGENE, OREGON

GRINDER FOR CONCAVE SAW TEETH

Application filed May 25, 1927. Serial No. 194,170.

Our invention relates to saw grinders, especially adapted for hollow grinding, that is, to concave the cutting faces of the teeth of circular saws.

Saw teeth having their cutting faces hollow ground are better adapted to do efficient work than saw teeth which are ground to a plane surface, because by hollow grinding, their lateral edges are rendered sharp and knife-like, and are then capable of making a cleaner cut through the wood than saw teeth whose cutting faces are not hollow ground, but which have "chisel" points with square lateral edges; the latter tending to make a rough cut, leaving projecting fibers, sometimes called "whiskers" which tend to exert more or less pressure and friction on the sides of the saw.

But machines heretofore provided for hollow grinding saw teeth were inefficient, because they tended to concave cutting faces in the manner diagrammatically illustrated by Fig. 1, of the accompanying drawings. Note the concave cut A. Such grinding tended to produce a projecting heel as at B, which tended to whirl the shavings or sawdust around and away from the pocket of the throat D, as illustrated by the arrows C, and to clog the work, whereas if the projection B were not present, the shavings would fly down deeper into the throat D and clear the saw.

In order to prevent said undesirable effect, a second operation is sometimes resorted to, to remove the point B, but such additional work consumes too much time. For these reasons, we believe hollow ground saw teeth have not come into general use.

Heretofore, the concave faces of hollow ground saw teeth were ground by grinding wheels provided with rounded peripheral working faces rotated about an axis at right angles to the saw blade, and such arrangement, as before mentioned, tended to hollow ground the cutting faces in two directions, which produces the point B.

Therefore, one of the principal objects of our invention is to provide a saw grinder arranged as shown in Fig. 2, the grinding wheel of which is provided with a cylindrical working face, and which is arranged to rotate on an axis lying in the plane of the saw, whereby the concave face of the saw tooth will be hollow ground in one direction only as at E; namely, along an axis parallel with the longitudinal plane of the saw, which will prevent the forming of a heel, similar to B, in Fig. 1, and shavings or sawdust will be thrown down into the throat D, and out as shown by the arrows F in Fig. 2, and consequently the saw tooth may be hollow ground in one operation, and with a great saving in time.

Another object of our invention is to provide a saw grinder, simple in construction and operation, which is adapted for vertical movement along its axis of rotation in the longitudinal plane of the saw tooth, whereby the saw grinding wheel may be brought into and out of operative engagement with the saw tooth, quickly and conveniently.

A further object of our invention is to provide a device which may be mounted in the form of an attachment on a machine of the type described in the patent issued to Edward P. Armstrong, August 25, 1925, No. 1,551,230, "Hand operated circular saw sharpener and gummer."

A still further object of our invention is to so arrange the attachment that it may be moved out of the way when not to be used, and in such position will not interfere with the ordinary use or operation of the saw sharpener and gummer on beveled toothed cut off saws, or other work, in which hollow grinding is not desired.

We have found that these objects are most advantageously obtained in a saw tooth grinder comprising, a frame adapted to be affixed to a support holding a circular saw, an arbor journaled in said frame and longitudinally reciprocable in the plane of the saw, the axis of rotation of said arbor if produced representing a chord of the circle described by the saw blade, means for rotating said arbor, and a cylindrical grinder wheel carried by said arbor, adapted to be inserted in the throats of the teeth of the saw blade, respectively, whereby the cutting face of the saw tooth operated upon will be concaved to represent a section of a cylinder whose axis lies in the plane of the saw and is parallel with the said face, and means normally holding the grinder wheel lifted from the saw blade.

Further particulars and other features and the details of construction of our invention, and its use in practice, are hereinafter fully described with reference to the remaining figures in the accompanying drawings:

In the drawings:

Fig. 1 shows diagrammatically a fragmentary portion of a circular saw and grinding wheel, the axis of rotation of which is arranged transversely of the saw and illustrates more clearly certain disadvantages of operation;

Fig. 2 shows diagrammatically a fragmentary portion of a circular saw and our cylindrical grinding wheel, the axis of rotation of which is arranged parallel with the saw and illustrates how the saw tooth is hollow ground in one direction only, and certain advantages thereof;

Fig. 3 shows a fragmentary side elevation of a circular saw and the relative position of the cylindrical grinding wheel and illustrates by portions shown in section further details of construction;

Fig. 4 shows a section taken on the line 4—4 of Fig. 3 looking in the direction of the arrows, and further illustrates the relative position of the grinding head and saw tooth;

Fig. 5 shows a perspective view of our hollow ground saw tooth;

Fig. 6 shows a fragmentary side elevation of our saw grinder arranged in operative position on the saw tooth;

Fig. 7 shows a top plan view of our saw grinder mounted on the table of a saw sharpener and gumming machine and in an operative position on a circular saw; and Fig. 8 shows a side elevation of our saw grinder mounted on the table of a saw sharpening and gumming machine, in an operative position and illustrates by broken lines how it may be swung back out of the way.

Our invention comprises a basal frame section $a$ fixed to the frame $b$ of a saw gumming and sharpening machine and a supplementary frame $c$ hinged to the basal frame section as at $d$.

A vertical post $e$ is fixed on the frame $c$ and a housing or grinder head $f$ is slidably mounted on the said post in two arms $f'$ and $f^2$ at the top and bottom of the housing. The arm $f^2$ extends beyond the post and is provided with a bifurcated end $f^3$ which engages a vertical guide $g$ fixed to the frame $c$.

A lever $h$ forming a frame $h'$ in which the housing $f$ is centrally mounted, is pivoted to an upright link $i$ pivoted to the frame $c$ to permit the housing $f$ to be moved longitudinally on the post $e$ and the arbor in the longitudinal plane of the saw tooth by the lever $h$.

A spring $j$ is mounted over the post $e$ between the arm $f'$ and a shoulder $k$ provided on the post $e$, which bears upwardly and tends to hold the housing $f$ normally raised.

A driving element, preferably an electric motor $l$ is provided in the housing $f$ to the spindle $m$ of the motor which extends vertically downward and serves as an arbor for a cylindrical grinding wheel $p$.

A guide $n$ is fixed to the frame $c$ which extends outwardly away from the machine and serves to hold the circular saw in alinement when it is fixed on an arbor $o$ fixed to the frame $b$ of the machine.

The operation of our invention is as follows:

A circular saw 2 will be fixed on the arbor $o$, which is part of the saw gumming and sharpening machine, and will be alined with our saw grinder by means of the guide $n$, which is an integral part of the frame $c$, so that the axis of the grinding wheel will coincide with the longitudinal axis of the saw tooth.

The housing $f$ will then be brought vertically downward on the post $e$ to the position shown in Figs. 6 and 8, so that the cylindrical face of the grinding wheel will be in contact with the saw tooth, and the curvature of the grinding wheel will be exactly equal to the curvature desired for the concave face of a hollow ground saw tooth, Figs. 2, 3 and 5.

By this construction, the curvature of the concave face of the saw tooth will not vary and the vertical axis of the concavity will always be exactly coincident with the longitudinal plane of the saw, since the housing $f$ will be moved on the fixed vertical post $e$ and the guide $n$ is an integral part of the grinder and in fixed relation to the grinding wheel $p$.

We claim:

1. A saw tooth grinder comprising, a frame adapted to be affixed to a support holding a circular saw, an arbor journaled in said frame and longitudinally reciprocable in the plane of the saw, the axis of rotation of said arbor if produced representing a chord of the circle described by the saw blade, means for rotating said arbor, a cylindrical grinder wheel carried by said arbor, adapted to be inserted in the throats of the teeth of the saw blade, respectively, whereby the cutting face of the saw tooth operated upon will be concaved to represent a section of a cylinder whose axis lies in the plane of the saw and is parallel with the said face.

2. A saw tooth grinder comprising, a frame adapted to be affixed to a support holding a circular saw, an arbor journaled in said frame and longitudinally reciprocable in the plane of the saw, the axis of rotation of said arbor if produced representing a chord of the circle described by the saw blade, means for rotating said arbor, a cylindrical grinder wheel carried by said arbor, adapted to be inserted in the throats of the teeth of the saw blade, respectively, whereby the cutting face of the saw tooth operated upon will be concaved to represent a section of a cylinder whose axis lies in the plane of the saw and is parallel with the said face, and means normally holding the grinder wheel lifted from the saw blade.

3. A saw tooth grinder comprising, a frame adapted to be affixed to a support holding a circular saw, an arbor journaled in said frame and longitudinally reciprocable in the plane of the saw, the axis of rotation of said arbor if produced representing a chord of the circle described by the saw blade, means for rotating said arbor, a cylindrical grinder wheel carried by said arbor, adapted to be inserted in the throats of the teeth of the saw blade, respectively, whereby the cutting face of the saw tooth operated upon will be concaved to represent a section of a cylinder whose axis lies in the plane of the saw and is parallel with the said face, means normally holding the grinder wheel lifted from the saw blade, and a guide carried by the frame.

4. A saw tooth grinder comprising, a frame adapted to be affixed to a support holding a circular saw, a member movable towards and from the saw held by said support and in the plane of such saw, an arbor journaled in said member and longitudinally reciprocable in the plane of the saw, the axis of rotation of said arbor if produced representing a chord of the circle described by the saw blade, a motor rotating said arbor, a cylindrical grinder wheel carried by said arbor, adapted to be inserted in the throats of the teeth of the saw blade, respectively, whereby the cutting face of the saw tooth operated upon will be concaved to represent a section of a cylinder whose axis lies in the plane of the saw and is parallel with the said face, and a spring normally holding the grinder wheel lifted from the saw blade.

5. A saw tooth grinder comprising, a frame adapted to be affixed to a support holding a circular saw, a member movable towards and from the saw held by said support and in the plane of such saw, an arbor journaled in said member and longitudinally reciprocable in the plane of the saw, the axis of rotation of said arbor if produced representing a chord of the circle described by the saw blade, a motor rotating said arbor, a cylindrical grinder wheel carried by said arbor, adapted to be inserted in the throats of the teeth of the saw blade, respectively, whereby the cutting face of the saw tooth operated upon will be concaved to represent a section of a cylinder whose axis lies in the plane of the saw and is parallel with the said face, a spring normally holding the grinder wheel lifted from the saw blade, and a guide carried by the frame.

6. A saw tooth grinder comprising, a frame adapted to be affixed to a support adapted for holding a circular saw, a post carried by said frame, a grinding head longitudinally reciprocable on said post in the plane of the saw, a spring normally holding said grinding head in inactive position, said grinding head comprising a driven arbor, the axis of which if produced representing a chord of the circle described by the saw blade, a cylindrical grinder wheel carried by said arbor, adapted to be inserted in the throats of the teeth of said saw blade, respectively, whereby the cutting face of the saw tooth operated upon will be concaved to represent a section of a cylinder whose axis lies in the plane of the saw and is parallel with the face of the said saw tooth.

7. A saw tooth grinder comprising, a frame adapted to be affixed to a support adapted for holding a circular saw, a post carried by said frame, a grinding head longitudinally reciprocable on said post in the plane of the saw, means for aligning the grinding head with the work, a spring normally holding said grinding head in inactive position, said grinding head comprising a driven arbor, the axis of which if produced representing a chord of the circle described by the saw blade, a cylindrical grinder wheel carried by said arbor, adapted to be inserted in the throats of the teeth of said saw blade, respectively, whereby the cutting face of the saw tooth operated upon will be concaved to represent a section of a cylinder whose axis lies in the plane of the saw and is parallel with the face of the said saw tooth.

EDWARD P. ARMSTRONG.
ROBERT S. JACKSON.